United States Patent [19]
Klink

[11] 3,719,972
[45] March 13, 1973

[54] SAFETY BELT DEVICE FOR OCCUPANTS OF MOTOR VEHICLES

[76] Inventor: Wolf-Dieter Klink, 7071 Lindach, Danziger 520, Germany

[22] Filed: Sept. 21, 1971

[21] Appl. No.: 182,323

[30] Foreign Application Priority Data

Sept. 28, 1970 Germany............P 20 47 706.9

[52] U.S. Cl................24/193, 24/170, 242/107.4, 280/150 SB
[51] Int. Cl.....................A44b 11/12, A62b 35/00
[58] Field of Search...280/150 SB; 242/107.4, 107.3; 297/384, 385, 388; 248/305, 316; 24/197, 193, 170

[56] References Cited

UNITED STATES PATENTS

| 438,912 | 10/1890 | Day......................24/170 |
| 3,551,961 | 1/1971 | Nygren.................24/196 |

Primary Examiner—Donald A. Griffin
Attorney—Arthur E. Wilfond et al.

[57] ABSTRACT

A safety belt device for an occupant of a motor vehicle equipped with a belt rewinding mechanism supplying a safety belt is disclosed. The device includes a bracket mounted on the vehicle and latching arrangement hinge connected to the bracket for holding the belt at a selected point thereof so as to leave the portion of the belt passing through the latching arrangement accessible to the occupant. The latching arrangement includes an ancillary member movable between closed and open positions, the ancillary member being movable to the open position for releasing the belt by direct manual action on the ancillary member as well as by manually pulling the free portion of the belt.

7 Claims, 4 Drawing Figures

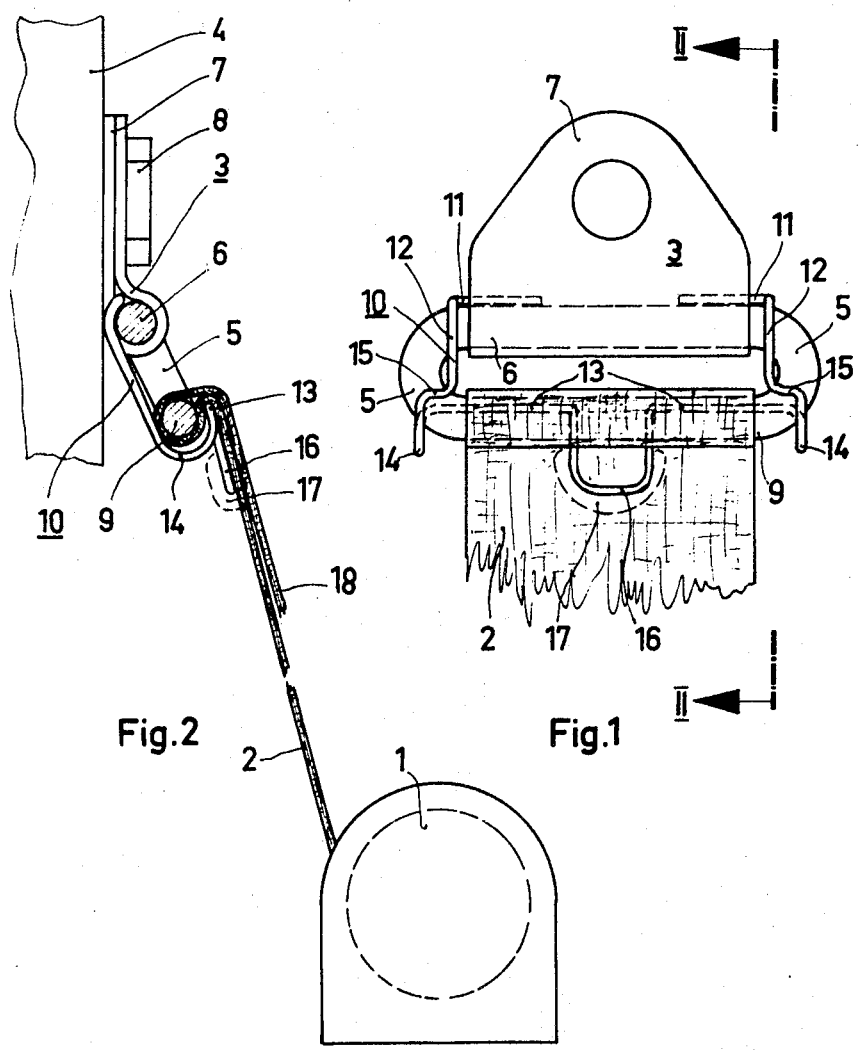

SAFETY BELT DEVICE FOR OCCUPANTS OF MOTOR VEHICLES

My invention relates to a safety device for occupants of motor vehicles equipped with an automatic winding mechanism for the belt. The device includes a bracket and hinged latching arrangement for holding the belt or belt strap leading to the automatic winding mechanism. The bracket, for example, is mounted at the door jamb of the vehicle.

In known configurations of safety belt arrangements of this type, the belt lies against the body of the occupant strapped in, with a pressure corresponding to the tension of the automatic winding mechanism. In many cases, this pressure is found disagreeable and is one of the reasons why safety belts are not used by occupants of motor vehicles.

In order to eliminate this shortcoming, a clamping device has been suggested to lock the belt strap by means of a manually operated hinged lever. This locking device, however, is relatively expensive and therefore leads to a considerable increase in cost for the safety device.

It is an object of the invention to provide a safety belt device of simple construction and low cost to block the return of the belt to the belt rewinding mechanism.

According to a feature of my invention, a latching means is hinge connected to a bracket and blocks the rewinding of the belt at a selected point thereof, the belt having been pulled out of the automatic rewind mechanism. The latching means includes an ancillary member which can be placed in its operative or closed position manually for holding the belt and can be released to an open position by pulling at the free part of the belt and/or by direct manual operation. According to a preferred embodiment of the invention, the ancillary member is a spring yoke which is hinged at the bracket and clamps the belt in its operative or closed position.

Preferably, the latching means includes a buckle, of which the leg that is surrounded by the belt is at least partially surrounded in the operative or closed position by the spring yoke resting on the belt, so that the spring yoke is clamped self-holding in that position.

In a preferred embodiment, the spring yoke is configured to be essentially of a U-shape, the lateral legs of the yoke being bent inward at right angles at the end portions to act as support pins for the yoke. The yoke is bent in the center or bite portion in a hook-like shape for partially surrounding and engaging the buckle for clamping the belt.

Although the invention is illustrated and described herein as a safety belt device for occupants of a motor vehicle it is nevertheless not intended to be limited to the details shown, since various modifications may be made therein within the scope and range of the claims. The invention, however, together with additional objects and advantages will be best understood from the following description and in connection with the accompanying drawings in which:

FIG. 1 shows a front view of a safety belt device according to the invention;

FIG. 2 is a side view, partially in section, of the safety belt device of FIG. 1 taken at line II—II as well as a schematic representation of the belt rewinding mechanism;

Figure 3:
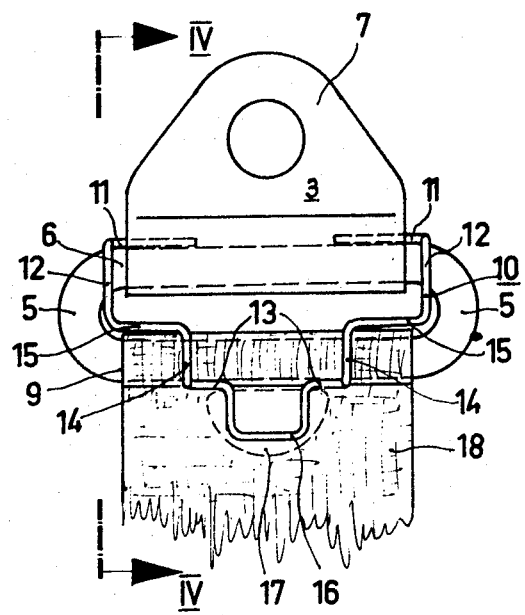
FIG. 3 is a front view of a safety belt device equipped with an alternate spring yoke.

In the embodiment according to FIGS. 1 and 2, the belt 2 is wound on an automatic winding mechanism 1 and is passed over a safety belt device 3 which is rigidly attached to the interior of the vehicle, for instance, at a door jamb 4. The latching means of the device 3 includes a hinged support member or buckle 5 is through which the belt 2 is looped. The buckle 5 mounted on the mounting bracket 7 which goes around the leg 6 of the buckle. The bracket is connected by means of a fastening screw 8 with the door jamb 4. The latching means further includes a return latch for the belt 2 around the leg 9 of the buckle consisting of a spring yoke 10 which is configured to be essentially U-shaped. The ends 11 of the legs 12 are bent inward and engage the mounting bracket 7.

In the region of the center portion 13 the lateral legs 12 are bent to form the hooks 14 which partially surround the legs 9 of the buckle. The lateral legs 12 further have offsets 15 and the center portion 13 has a loop-shaped bend 16 to which a handle 17 can be attached.

After the length of the belt 2 lying against the occupant is determined the spring yoke 10 is swung into the operative or closed position shown in the drawing and the belt 2 is thereby clamped against the leg 9 of the buckle, so that the pull of the automatic winding mechanism 1 is not transmitted to the free portion 18 of the belt 2 which lies against the body of the occupant to be secured.

By pressing the handle 17 or by a vigorous pull at the belt portion 2 the spring yoke 10 is ejected from the operative or closed position shown to its open position. After the length of the belt part 18 is again adjusted, the spring yoke 10 can be latched again in the closed position shown.

Figure 4:
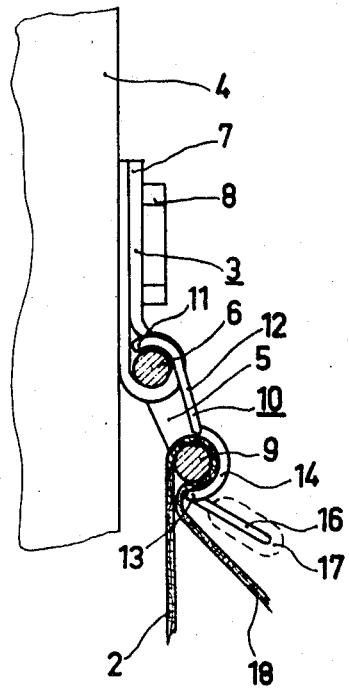
FIG. 4 is a side view, partially in section, of the device of FIG. 3 taken along the line IV—IV.

In the embodiment example shown in FIGS. 3 and 4, the spring yoke 10 surrounds the leg 9 of the buckle not from behind, but from the front. Furthermore, the offsets 15 are facing in the opposite direction. In both embodiments, however, the spring action of the lateral legs 12 of the spring yoke 10 must be overcome in setting or loosening, respectively, the return latch to the extent that the hooks 14 snap in or out, respectively, and thereby either lock or release the belt 2.

I claim:

1. Safety belt device for an occupant of a motor vehicle equipped with a belt rewinding mechanism supplying a safety belt, said device comprising a bracket mounted on the vehicle, and latching means hinge connected to said bracket for holding the belt at a selected point thereof so as to leave the portion of the belt passing through said latching means accessible to the occupant, said latching means including ancillary means movable between closed and open positions, said ancillary means being movable to said open position for releasing the belt by direct manual action on said ancillary means as well as by manually pulling the free portion of the belt.

2. The safety belt device of claim 1, wherein said latching means including a support member for holding said belt, and said ancillary means being a spring yoke pivotally connected to said bracket for clamping said belt against said support member in said closed position.

3. The safety belt device of claim 2, wherein said support member being a buckle hinge connected to said bracket, said buckle having a pair of mutually spaced legs, the belt being looped over one of said legs, a portion of said spring yoke being shaped so as to engage said one leg of said buckle to clamp the belt.

4. The safety belt device of claim 3, wherein said spring yoke is substantially a U-shaped member, the end portions of the legs of said yoke being bent toward each other at right angles for engaging said bracket, the bite of said yoke being hook-shaped so as to partially surround and engage said one leg of said buckle for clamping the belt.

5. The safety belt device of claim 4 wherein the legs of said yoke are offset outwardly near said bite.

6. The safety belt device of claim 5, wherein a portion of the bite of said spring yoke is a loop-shaped extension.

7. The safety belt device of claim 6, wherein said loop-shaped extension is at the center portion of said bite, said device comprising a handle attached to said loop-shaped extension.

* * * * *